(12) United States Patent
Cahn

(10) Patent No.: US 7,545,815 B2  
(45) Date of Patent: Jun. 9, 2009

(54) QUEUEING TECHNIQUE FOR MULTIPLE SOURCES AND MULTIPLE PRIORITIES

(75) Inventor: Robert Cahn, Carmel, NY (US)

(73) Assignee: AT&T Intellectual Property II, L.P., Reno, NV (US)

( * ) Notice: Subject to any disclaimer, the term of this patent is extended or adjusted under 35 U.S.C. 154(b) by 616 days.

(21) Appl. No.: 10/967,591

(22) Filed: Oct. 18, 2004

(65) Prior Publication Data

US 2006/0083226 A1    Apr. 20, 2006

(51) Int. Cl.  
H04L 12/28    (2006.01)

(52) U.S. Cl. .............................. 370/395.42; 370/230.1; 370/386; 370/358

(58) Field of Classification Search ................ 370/235, 370/395.4, 389, 386, 395.42, 230.1, 358  
See application file for complete search history.

(56) References Cited

U.S. PATENT DOCUMENTS

| | | | | |
|---|---|---|---|---|
| 5,959,993 A * | 9/1999 | Varma et al. | | 370/397 |
| 5,999,534 A * | 12/1999 | Kim | | 370/395.42 |
| 6,182,177 B1 * | 1/2001 | Harriman | | 710/112 |
| 6,198,723 B1 * | 3/2001 | Parruck et al. | | 370/230.1 |
| 6,201,793 B1 * | 3/2001 | Chen et al. | | 370/238 |
| 6,317,416 B1 * | 11/2001 | Giroux et al. | | 370/232 |
| 6,359,861 B1 * | 3/2002 | Sui et al. | | 370/230 |
| 6,438,134 B1 * | 8/2002 | Chow et al. | | 370/412 |
| 6,452,933 B1 * | 9/2002 | Duffield et al. | | 370/415 |
| 6,538,989 B1 * | 3/2003 | Carter et al. | | 370/229 |
| 6,594,704 B1 | 7/2003 | Birenback et al. | | |
| 6,671,258 B1 | 12/2003 | Bonneau | | |
| 6,744,767 B1 | 6/2004 | Chiu et al. | | |
| 6,744,776 B1 | 6/2004 | Kalkunte et al. | | |
| 6,862,265 B1 * | 3/2005 | Appala et al. | | 370/235 |
| 7,054,267 B2 * | 5/2006 | Ramanan et al. | | 370/229 |
| 7,110,411 B2 * | 9/2006 | Saidi et al. | | 370/395.4 |
| 7,142,513 B2 * | 11/2006 | Sun et al. | | 370/232 |
| 7,190,674 B2 * | 3/2007 | Kobayakawa et al. | | 370/235 |
| 7,257,083 B2 * | 8/2007 | Bansal et al. | | 370/235 |
| 7,342,929 B2 * | 3/2008 | Bremler-Barr et al. | | 370/395.4 |
| 2003/0103514 A1 * | 6/2003 | Nam et al. | | 370/412 |
| 2003/0112755 A1 * | 6/2003 | McDysan | | 370/230 |
| 2004/0093492 A1 | 5/2004 | Daude et al. | | |

* cited by examiner

*Primary Examiner*—Ricky Ngo  
*Assistant Examiner*—Dewanda Samuel

(57) ABSTRACT

A method of dealing equitably with traffic from multiple VPNs feeding into a single router utilizes the weighted fair queueing (WFQ) technique of the prior art in combination with a "service level" queue comprising a set of tokens defining the class of service (COS) with the next packet to be transmitted and a queue selector that functions to query each queue in a round robin fashion. The service level queue ensures that the higher priority traffic will be transmitted first, while the queue selector ensures that each VPN will receive similar service. The queue selector may be "weighted" in that if a particular VPN generates substantially more traffic than the other VPNS, that VPN will be selected more than once during a round robin cycle to transmit a packet ("weighted round robin" WFQ).

5 Claims, 1 Drawing Sheet

QUEUEING TECHNIQUE FOR MULTIPLE SOURCES AND MULTIPLE PRIORITIES

TECHNICAL FIELD

The present invention relates to a queueing technique and, more particularly, to a queueing technique for equitably handling multiple sources, with multiple priorities, entering a single queue.

BACKGROUND OF THE INVENTION

There are many applications, particularly within the realm of data transmission, where multiple streams of information need to be collected and routed through various points. For example, routers are used with the Internet to move data traffic from one point to another across the network. As is well-known in the art, each data packet may include an identified "class of service" (COS) that defines the priority with which that packet is to be moved with respect to other packets in the network. Obviously, as millions of these packets are moved every minute, "traffic jams" at various router locations are likely to occur.

Complicating matters is the every-increasing use of virtual private networks across the IP network. A virtual private network (VPN) is a private data network that makes use of the public telecommunications infrastructure, maintaining privacy through the use of a tunneling protocol and security procedures. A virtual private network can be contrasted with a system of owned or leased liens that can only be used by one company. The idea of the VPN is to give the company/owner the same capabilities at a much lower cost by using the shared public infrastructure rather than a private one. When multiple VPNs use a common router (which is often the case), it is possible for the high priority traffic from one VPN to interfere with the high priority traffic associated with the other VPNs.

Thus, a remaining problem in the art is that there is currently no guarantee of "fairness" among high priority traffic flows from different VPNs sharing a common router.

SUMMARY OF THE INVENTION

The need remaining in the prior art is addressed by the present invention, which relates to a queueing technique and, more particularly, to a queueing technique for equitably handling multiple sources, with multiple priorities, entering a single queue.

In accordance with the present invention, a technique referred to as "round robin" weighted fair queueing (WFQ) has been developed that not only addresses the queueing issues previously corrected by using a WFQ approach, but further implements the ability to pre-determine the VPN order for use with the WFQ to ensure that high priority traffic from each VPN is treated in similar fashion. Multiple queues are utilized, each associated with a different VPN, with an additional queue including tokens identifying the particular COS associated with the next packet to be added to the data stream. A queue selector, configured to identify the next queue to insert a packet into the data stream, is used in association with the COS queue to provide the desired "round robin" function to the queueing technique. As a result, the inventive round robin weighted fair queueing (RR-WFQ) preserves the service level for a particular class as a whole, but alters the queueing of packets from each VPN subscribing to that class.

In a further arrangement of the present invention, the amount of traffic generated by each VPN can be included with the RR-WFQ to further even out the availability of the data channel to each VPN. That is, if one VPN generates twice as much traffic as two other VPNs (all being of the same COS), the queue selector will be configured so that the first VPN will be queued up twice in each "round robin" cycle. This advanced arrangement of the present invention is defined as "weighted round robin, weighted fair queueing" (WRR-WFQ).

It is to be understood that although the details of the queueing methodology of the present invention are described below in terms of queueing multiple classes of packet traffic from multiple VPNs sharing a single server, the technique itself is applicable to virtually any situation where a "single element" needs to equitably deal with multiple sources of information/data, with multiple priority levels associated with the data at each source.

Indeed, the general methodology of the present invention will become apparent during the course of the following discussion and by reference to the accompanying drawings.

BRIEF DESCRIPTION OF THE DRAWINGS

Referring now to the drawings.

DETAILED DESCRIPTION

As discussed above, the ability to equitably support multiple VPNs (usually with competing traffic of the same "high" priority) through a single router (or any other gating device) is difficult in today's data network architecture. One approach that is currently used to address this situation is "weighted fair queueing", where each different class of service (COS) is assigned a different weight. Table I, as shown below, is exemplary of one weighting scheme:

TABLE I

| Class of Service | WFQ Weight (w) |
| --- | --- |
| COS2 | 0.6 |
| COS3 | 0.3 |
| COS4 | 0.1 |

It is presumed for the purposes of the present discussion that each VPN sharing a single router generates traffic at the COS2 level. When using the WFQ technique, the scheduled departure time, $F_j$, for each arriving packet, P, is determined by using as inputs both the arrival time, $t_0$, of the packet and the length, L, of the packet. If there are currently no packets of that class in the queue, the scheduled departure time is calculated by the following:

$$F_j = t_0 + L/w_i,$$

where $w_i$ is the WFQ weight for that particular COS. If there are previous packets of that class already in the queue, the departure time of the newly-arrived packet is defined by:

$$F_j = F_{j-1} + L/w_i,$$

where $F_{j-1}$ is defined as the departure time for the previous packet of that same COS in the queue.

Figure 1:
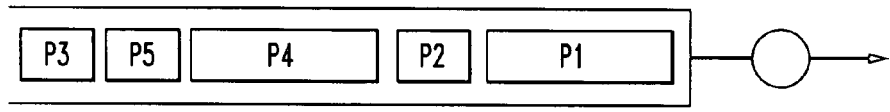
FIG. 1 illustrates an exemplary WFQ arrangement of the prior art, where a single queue is used to share traffic from multiple VPNs.

The application of this prior art WFQ technique to scheduling traffic from a pair of VPNs is illustrated in FIG. 1, where an exemplary set of five packets from these VPNs is defined in the following Table II:

TABLE II

| Packet Number | VPN Identity | Class of Service (COS) |
|---|---|---|
| P1 | VPN1 | COS2 |
| P2 | VPN1 | COS2 |
| P3 | VPN2 | COS3 |
| P4 | VPN1 | COS2 |
| P5 | VPN2 | COS2 |

As shown in FIG. 1, all of the packets associated with the WFQ technique are held in a single queue, regardless of the number of different classes of service or the number of VPNs feeding into the router. In the prior art WFQ technique, the packets are ordered by departure time, with the packet having the earliest departure time positioned first in the queue. Clearly, relatively small values of $w_i$ have the effect of continuing to push a packet (or packets) back in the queue as higher priority traffic arrives. Referring to FIG. 1, there are currently two COS2 packets, denoted P4 and P5, placed ahead of packet P3 in the queue, where packet P3 is a COS3 packet. As noted above, the problem with using multiple VPNs is that if P1, P2 and P4 are all from the same VPN (defined as VPN1), and packet P5 is from another VPN (defined as VPN2), packet P5 will experience more delay that is desirable, since the WFQ is "source blind" and determines queue order by departure time only.

Figure 2:
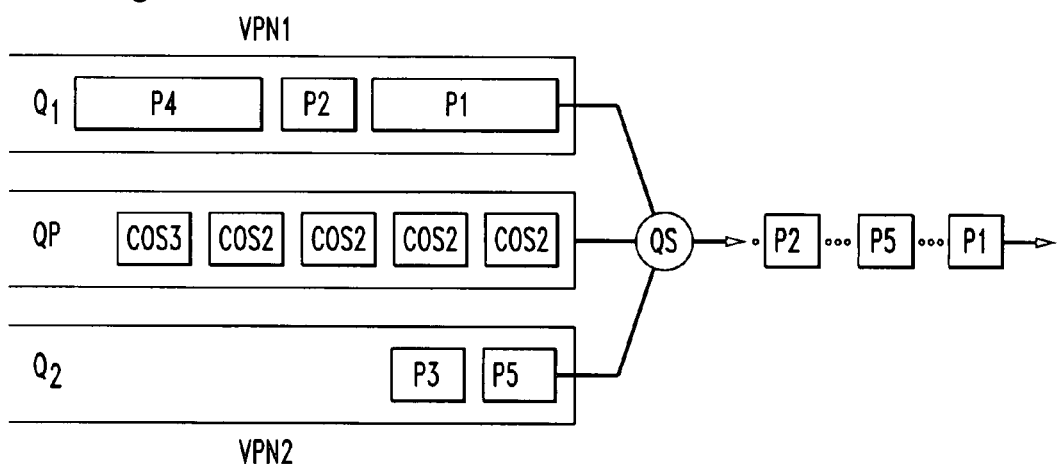
FIG. 2 illustrates an exemplary RR-WFQ of the present invention for use with multiple VPNs, including a separate queue for each VPN, as well as a queue for the COS tokens associated with each VPN.

The problem of sharing a singe router with multiple VPNs (or in the more general case, for sharing a single "sink" for information with multiple "sources", each "source" having multiple priorities), is addressed by the round-robin weighted fair queueing technique of the present invention. A simplified implementation of the RR-WFQ technique is illustrated in FIG. 2. As shown, each VPN is associated with its own queue. In this case VPN1 has a first queue Q1 and, similarly, VPN2 has a second queue Q2. For the sake of illustration, the same packets of Table II are used in association with FIG. 2, where packets P1, P2 and P4 are illustrated as queued in Q1 of VPN1 and packets P3 and P5 are illustrated as queued in Q2 of VPN2.

In accordance with the present invention, a separate priority queue, denoted QP, is included in the arrangement, where queue QP holds tokens associated with the COS levels of each traffic packet, with the highest level COS tokens disposed in the beginning of the queue. In this case, a set of four COS2 tokens (for packets P1, P2, P4 and P5) are disposed in front of the COS3 token associated with packet P3. A queue selector QS is used in conjunction priority queue QP to determine the identity of the particular queue to be selected for offering a packet. As will be discussed below, the queue selector QS may simply cycle through each queue, one at a time, until each queue has had a turn. Alternatively, different schemes and selection algorithms may be applied.

Referring back to FIG. 2, with a COS2 token at the head of the round robin queue, a COS2 packet is taken, in round robin fashion based on the state of the queue selector, from either Q1 or Q2. Should the selected queue be empty, the next queue in sequence is chosen. Looking at the arrangement of FIG. 2, therefore, it may be presumed that the next packet to be transmitted would be packet P1 from queue Q1. Subsequent to this packet being selected, the priority queue includes another COS2 token. Applying the round robin method, a COS2 packet from Q2 is selected, in this case, P5. The next selected COS2 packet would be P2, and so on, where when only two queues are present, the queue selector may merely toggle from Q1 to Q2 in performing the selection process.

As a result of implementing the round robin strategy of the present invention with the set of WFQ-implemented VPN queues, packet P5 does not have to wait for P1, P2 and P4 to all be transmitted before it is selected (since otherwise the length of P5 would push it behind P4, as shown in FIG. 1). Although shown in the diagram of FIG. 2 as used with a pair of VPNs, it is to be understood that the round robin process of the present invention can easily be implemented with a plurality of N VPNs all sharing the same router, where the selection process begins at queue Q1, then, for example, queue Q2, Q3, Q4, . . . until reaching QN and then returning to Q1.

The round robin situation described above (taking one packet from each queue in turn) works well if the amount of traffic generated within each queue is ideally one-to-one. However, in some (if not most) of the cases, one VPN will generate significantly more or less traffic than the other VPNs sharing the same router. In this case, the simple round robin technique would disadvantage those VPNs generating more traffic by treating each VPN the same. Thus, an extension of the inventive technique can be used to "weight" each queue feeding into router, where this technique is referred to as "weighted round robin, weighted fair queueing", or WRR-WFQ.

Figure 3:
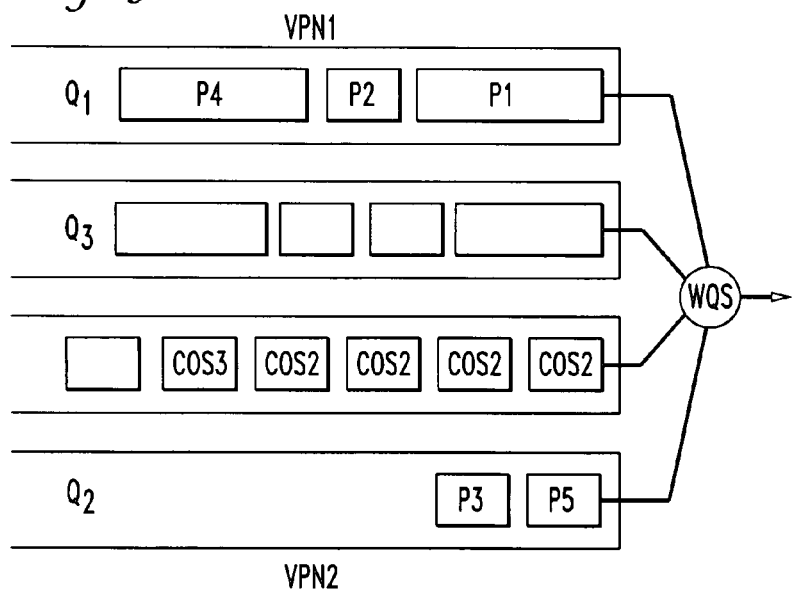
FIG. 3 illustrates an exemplary WRR-WFQ of the present invention, which also takes into consideration the amount of traffic generated by each queue.

As shown in FIG. 3, for the WRR-WFQ process, a weighted queue selector WQS is configured to define a predetermined sequence in which the queues are to be addressed. For example, presume that there are three VPNs, denoted VPN1, VPN2 and VPN3, each having an associated WFQ queue, denoted as Q1, Q2 and Q3 in the diagram. Further, it is known that VPN1 generates 50% of the traffic, VPN2 generates 30% of the traffic, and VPN3 generates the remaining 20% of the traffic. In this case, weighted queue selector WQS may be configured to select the queues in the following cyclic sequence:

Q1-Q2-Q3-Q1; Q1-Q2-Q3-Q1, . . .

thus ensuring that Q1 is selected twice in each cycle or "round". Other configurations are possible. Indeed, there is no need for the queue selector to precisely adjust the selection sequence to the ratio of the generated packets. As long as some reasonable weighting scheme is applied, an improved distribution of packets as a function of generation rate will be achieved.

An important aspect of the RR-WFQ technique of the present invention is that it preserves the service level for a particular COS as a whole (through the priority queue), simply by altering the service sequence within that class. Moreover, the scheme is simple enough to be implemented in application-specific integrated circuits (ASICs), as is required by the desire to develop a low-cost high-speed solution. Indeed, both of the RR-WFQ and WRR-WFQ techniques of the present invention are considered to be significant improvements over the prior art WFQ so as to allow for multiple VPNs (in general, multiple users of a single entity) to fairly share a class of service level at a single connection point into the network. Both of these inventive queueing protocols are, like WFQ, simple enough to implement that they may easily be incorporated into today's routers.

It is to be understood, as mentioned above, that the present invention goes well beyond the implementation of servicing multiple VPNs through a single router. Indeed, the present invention is deemed to be applicable to any situation where multiple sources of information are to be funneled into a single information sink, where various items of information may have different priorities. Thus, the inventive RR WFQ techniques of the present invention are considered to be limited in scope only by the claims appended hereto.

What is claimed is:

1. A method for queueing information packets from a plurality of N sources into a single output queue, each source generating information at M different priority levels, the method comprising the steps of:
 a) creating a separate input queue for each source of information packets;
 b) applying weighted fair queueing to each input queue created in step a) by
  i) assigning a priority weight $w_i$ to each one of the M different priority levels, such that the total for all M levels is equal to one;
  ii) determining the length L of a packet recieved at a selected input queue at a time $t_0$;
  iii) ascertaining the priority level of the received packet;
  iv) if there are no other packets of that priority level in the selected input queue, determining the scheduled departure time $F_j$ as the quantity $t_0 + L/w_i$, otherwise if there are packets of that priority in the selected input queue, determining the scheduled departure time $F_j$ as the quantity $F_{j-1} + L/w_i$, and
  v) inserting each packet in its selected input queue in descending departure time order;
 c) creating a token queue of tokens associated with the total number of packets queued in each input queue, the tokens queued in descending priority level of the M different priority levels;
 d) providing a queue selector for determining the identity of the queue to be next selected for packet transmission based upon a round robin selection cycle that takes packets from each input queue in turn; and
 e) selecting the next packet to be transmitted based in the priority level of head token in the token queue and the identity of the next-selected queue from the queue selector.

2. The method as defined in claim 1 wherein performing step d), each input queue is selected only a single time during each round robin cycle.

3. The method as defined in claim 1 wherein in performing step d), each queue is selected a predetermined number of times during a round robin cycle as a function of the relative number of packets generated by each in put queue.

4. The method as defined in claim 1 wherein in the information packets are data packets transmitted through a data communication network and the plurity of M priority levels are defined as a plurality of M class of service (COS) levels.

5. The method as defined in claim 4 wherein each source of information is associated with a separate virtual private network.

* * * * *